%. XR   3552357   EX

United States Patent

[11] 3,552,357

| [72] | Inventors | Daniel B. Quayle<br>Wellington;<br>Trevor P. Clark, North Vancouver, British Columbia, Canada |
|---|---|---|
| [21] | Appl. No. | 829,723 |
| [22] | Filed | June 2, 1969 |
| [45] | Patented | Jan. 5, 1971 |
| [73] | Assignee | Canadian Patents and Development Limited<br>Ottawa, Ontario, Canada<br>a corporation of Canada |

[54] ARTIFICIAL OYSTER CULTCH AND METHOD OF PRODUCING SAME
20 Claims, No Drawings

[52] U.S. Cl. .......... 119/4, 106/95, 106/99
[51] Int. Cl. .......... A01k 61/00
[50] Field of Search .......... 119/1—4; 106/95, 99

[56] References Cited
UNITED STATES PATENTS

| 2,319,170 | 5/1943 | Toner | 119/4 |
| 3,017,857 | 1/1962 | Munz | 119/4 |

FOREIGN PATENTS

| 7,998 | 12/1927 | Australia | 119/4 |

*Primary Examiner* — Aldrich F. Medbery
*Attorney* — Fetherstonhaugh & Co.

ABSTRACT: A composition for artificial oyster cultches made up of a compressed mixture of hydraulic cement, lime, an antislime lubricant, gypsum, and a fibre binding material, said compressed mixture being substantially saturated with a catalyzed aqueous solution. The method of making oyster cultches which comprises mixing in the dry state said cement, lime, antislime lubricant, gypsum and fibre binding material, pressing said mixture into cultches under high pressure, substantially saturating the formed cultches with the catalyzed aqueous solution, and hardening the formed cultches.

ARTIFICIAL OYSTER CULTCH AND METHOD OF PRODUCING SAME

BACKGROUND OF THE INVENTION

This invention relates to artificial oyster cultch compositions, and methods of making cultches incorporating these compositions.

Since the time of the ancient Egyptians, the oyster industry has depended on the collection of oyster larvae, referred to as "spat," on various materials to which they attach themselves, and they are subsequently distributed on suitable oyster beds where the oysters are allowed to develop and are finally harvested when they have reached a suitable size. The materials used as collectors of spat have consisted of stones, oyster shells, bamboo, tiles, tarred ropes and rubber tires, with the use of oyster shells and bamboo predominating. Although many other materials such as glass, Portland cement, paper, wood, ceramics and many plastics have been tried, there have been no economically feasible or successful substitutes for the ancient use of oyster shells or bamboo. There are a number of reasons for the failure of these substitutes, such as excessive weight or cost, difficulties of handling or reluctance of the oyster larvae to accept the materials. Even the oyster shells, bamboo and tiles, although attractive to oyster spat, suffer from enormous disadvantages for use in the oyster industry. These materials are difficult and costly to handle. Unless such collectors are placed out very close to the time of spawning of the oysters, slime forms on their surfaces and they are subsequently rejected by the young oyster larvae. In the Western hemisphere where the use of bamboo is not practical for costly labour reasons, the use of oyster shell, which is the most predominating practical cultch in use, has many disadvantages. Due to the shape of oyster shell, a large percentage of the spat are killed owing to the collection of silt on the shell, or they die when trapped underneath.

Shell also is very subject to the collection of slime. Since the shell does not disintegrate during the early life of the oyster, it becomes necessary to separate the oysters after about one year from the time of collection of spat so that they can develop satisfactorily. This separation is carried out by chopping or smashing the crowded oysters apart, with a resulting mortality rate of over 30 percent. Other materials which have been tried, such as Portland cement aggregates, plastics, etc. also suffer from these disadvantages. Recent attempts have been made to overcome the natural reluctance of the spat to accept plastic by making cultch of these materials with very rough surfaces, with or without coating of lime. However, plastic cultch is costly, and is not silt or slime free. The oysters do not adhere well to the plastic and frequently fall off the cultch when too young and die in mud or silt. Also, since the plastic will not disintegrate in sea water, there still remains the problem of separation of the oysters after approximately one year of existence.

SUMMARY OF THE INVENTION

The present invention overcomes the above problems by providing compositions for artificial oyster cultches, and methods of making cultches from these compositions which result in cultches that are light in weight, easy to handle, do not collect slime or silt, are very attractive to oyster larvae, and most important of all, are self-destructuve after exposure to sea water for an appropriate time so that the oysters are automatically separated therefrom with practically no loss of life.

The composition according to the present invention for making artificial oyster cultches comprises from about 5 to 75 percent Portland cement (preferably a type not resistant to sulfate) or aluminous hydraulic cement; from about 0 to 50 percent lime in the form of calcium hydroxide or slaked lime; from about 0.2 to 5.0 percent lubricant selected from the group consisting of zinc stearic acid, calcium stearate, magnesium stearate, aluminum stearate or zinc soaps including zinc oleate, zinc lactate, and zinc palmitate; from about b 5 to 30 percent gypsum or calcium sulfate; and a fibrous binding material, preferably asbestos fibers, in sufficient amount to make up the balance to 100 percent. This mixture after compression is substantially saturated with a catalyzed solution. This aqueous solution is preferably a calcium chloride solution of about 8 percent concentration. Part of the fibrous binding material may be replaced by a filler material selected from the group consisting of calcium carbonate, silica, talc, and barium sulfate or other inert fillers.

The method according to present invention comprises mixing in the dry state said cement, lime, lubricant, gypsum, and fibrous binding material in the designated proportions, pressing said mixture into cultches under sufficient pressure to enable the formed cultches to be handled, substantially saturating the formed cultch with the catalyzed aqueous solution in any suitable manner, such as by spraying, and hardening the formed cultches. The formed cultches can be allowed to harden on their own, or they may be subjected to heat for this purpose.

The cultches may be of any desired shape, and they are relatively thin, something of the order of one-eighth inch in thickness. Satisfactory results have been obtained by using a pressure in forming the cultches of something of the order of 8 to 12 tons.

When the cultches are sprayed with the aqueous calcium chloride solution, this is done until they are just about saturated with the solution but do not have an excess of liquid on their surfaces.

Cultches made of the present composition by the present method and when Portland cement is used are self-destructive after exposure to sea water for about one year. This results from the fact that the gypsum or calcium sulfate slowly reacts in the water with the cement to form the insoluble calcium sulphoaluminate with an accompanying increase in volume of almost twofold. The result of this expansion is collapse of the cultch in about a year from the collection of oyster spats and automatic separation of the oysters so that most of the latter survive this separation. The small amount of calcium sulfate found in Portland cement is inadequate to cause the required decomposition. As stated above, aluminous cement may be used in the composition, but the resulting cultches are not self-destructive, although they have the other advantages set out herein.

The idea of forming the cultches with the constituents in the dry stage and under high pressures is important in order that the material has unusual strength in thin sections so that it can withstand the requirements of rough handling. Castings made from Portland cement with aggregates, including asbestos, are not strong enough for use in a thin cultch and will not decompose satisfactorily in sea water. In addition, casting operations have the disadvantages in that they require large numbers of moulds, long setting periods, and are relatively slow so that it would be difficult to keep up to the demand for the large number of cultches required by the oyster industry.

When zinc stearate or the zinc soap is used as a lubricant the clutches are resistant to slime. This is a distinct advantage to the industry as it allows cultches to be placed out in the water early in the season, eliminating the necessity of testing the water for the onsets of spawning and the resulting "panic" placing of cultches as done in the industry prior to this invention In most cases, or a lot of slime forms on ordinary oyster cultches and a large loss of spat occurs as they do not like slime coated surfaces. Stearic acid, calcium stearate, magnesium stearate and aluminum stearate act as lubricants in the composition.

The compressing of the dry powders of the formula under high pressures followed by spraying of the compressed cultches with a catalyzed aqueous solution, gives freedom from pot life and a strength in the finished product that cannot be attained by casting the material. This method also allows for the use of a commercial tableting machine for the production of the cultches.

The use of calcium hydroxide or gypsum in the cultches provides better compressibility and adhesion in the dry pressed cultch before spraying with the aqueous solution, and also supplies a source of calcium carbonate which is attractive to oyster larvae. The zinc stearate or zinc soap have the combined purpose of providing lubrication to the dies of the pressing machine, promote flow of the material through the feed chute of the machine, and act as an anti slime agent in the cultch. When the stearates mentioned above, aside from zinc stearate, are used, the antislime quality of the cultches is lost, but they greatly assist the forming or processing of the cultches. The asbestos provides light weight and strength, and helps to give the right texture to the cultches required for oyster acceptance.

The following is considered an ideal formula for artificial oyster cultches, but it is to be understood that this is presented for illustrative purposes only and is not intended to be used in a limiting sense:

Portland cement, gypsum and calcium hydroxide were mixed together and thoroughly blended, in a ribbon type mixer as follows:

Portland Cement (Type I).......................... 4.1 lb.
Gypsum ($CaSO_4 \cdot 1/2 H_2O$).......................... 0.41 lb.
Calcium Hydroxide (Slaked Lime)............... 0.41 lb.

NOTE: The gypsum used is preferably the inhibited type, and the lime is preferably finely powdered slaked lime.

The above mixture was then thoroughly blended in a ribbon type mixer, with 5.1-pounds asbestos shorts. -pounds When the above components were well mixed, 0.10 pound of finely powdered zinc stearate was added and mixed thoroughly. To form the cultch, about 22 grams of this cultch compound was compressed, for each sample of cultch. The cultch may be made in various sizes but the ideal diameter for forming on industrial presses ranges from 2½ inches to 3.0 inches. For dies on a 2½ inches diameter, pressures up to 20,000-pounds total force on a 2½-inch diameter ram were used.

After compression the ejected cultch was sprayed by means of a fine spray with a solution of aqueous 8 percent calcium chloride solution. Gradual spraying was continued until the sample was just saturated with solution without any excess being retained on the surface. The cultch was then allowed to set until sufficient strength to withstand shipment was obtained. The calcium chloride promotes rapid hydration of the the Portland cement and prevents the sample drying prematurely before adequate hydration has taken place.

Although the above example provides an ideal composition for cultch the amounts of the components may be varied. For example the Portland cement may range between about 5 percent and 75 percent, the calcium hydroxide between about 0 percent and 50 percent, the gypsum between about 5 percent and 30 percent, the zinc stearate between about 0.2 percent and 5.0 percent, and the asbestos in sufficient amount to make up the balance to 100 percent. Other materials may be added as lubricants and can be used to partially replace the zinc stearate which acts both as an antislime agent and a lubricant. These other lubricants can consist of stearic acid, calcium stearate, magnesium stearate, aluminum stearate, zinc oleate, zinc lactate, zinc palmitate or any other zinc soap. They may be used in amounts of about 0.2 to 5.0 percent of the composition. The strength of the calcium chloride solution used for spraying may vary from between about 0 percent to 20 percent. If low values of calcium chloride are used, the samples B must be kept damp during the first 16 hours of hydration or low strength of the cultch will be evident. If solutions of calcium chloride solution of greater than 8 percent concentration are used, the cultch should be sprayed to only partial saturation followed by a water spray or low strength of the cultch will result. Other fillers such as calcium carbonate, silica, talc, or barium sulfate may be used to replace part of the asbestos to the extent of from about 0 percent to 50 percent of the composition

We claim:

1. An artificial oyster cultch, comprising a body of a compressed mixture of a cement selected from the group consisting of Portland cement and aluminous hydraulic cement; lime in the form of calcium hydroxide or slaked lime; a lubricant selected from the group consisting of zinc stearate, stearic acid, calcium stearate, magnesium stearate, aluminum stearate; and zinc soap; gypsum; and fibrous binding material; said compressed mixture being substantially saturated with a catalyzed aqueous solution.

2. The composition as claimed in claim 1 in which the catalyzed aqueous solution is an aqueous calcium chloride solution of between about 0 to 20 percent concentration.

3. The composition as claimed in claim 1 in which said fibrous binding material comprises asbestos fibers.

4. The composition as claimed in claim 1, including a filler material selected from the group consisting of calcium carbonate, silica, talc, and barium sulfate.

5. The composition as claimed in claim 1 comprising of a compressed mixture of about 5 to 75 percent of a cement selected from the group consisting of Portland cement and aluminous hydraulic cement; between about 0 to 50 percent lime in the form of calcium hydroxide or slaked lime, about 0.2 to 5.0 percent of a lubricant selected from the group consisting of zinc stearate, stearic acid, calcium stearate, magnesium stearate, aluminum stearate; and zinc soap; about 5 percent to 30 percent gypsum; and fibrous binding material sufficient to make up balance to 100 percent; said compressed mixture being substantially saturated with a catalyzed aqueous solution.

6. The composition as claimed in claim 5 in which the catalyzed aqueous solution is an aqueous calcium chloride solution of between about 0 to 20 percent concentration.

7. The composition as claimed in claim 5 in which said fibrous binding material comprises asbestos fibers.

8. The composition as claimed in claim 5 including with the fibrous binding material a filler material selected from the group consisting of calcium carbonate, silica, talc, and barium sulfate.

9. The method of producing an artifical oyster cultch which comprises mixing in the dry state a cement selected from the group consisting of Portland cement and aluminous hydraulic cement; lime in the form of calcium hydroxide or slake lime; a lubricant selected from the group consisting of zinc stearate, stearic acid, calcium stearate, magnesium stearate, aluminum stearate, and zinc soap; gypsum, and fibrous binding material; pressing said mixture into cultches under sufficient pressure to enable the formed cultches to be handled, substantially saturating the formed cultches with a catalyzed aqueous solution and hardening the formed cultches and placing the resultant cultch in a suitable oyster habitat.

10. The method as claimed in claim 9 in which the pressure used in forming the cultches is something of the order of 8 to 12 tons.

11. The method as claimed in claim 9 in which the catalyed aqueous solution is sprayed on to the compressed cultches.

12. The method as claimed in claim 9 in which the catalyzed aqueous solution is an aqueous calcium chloride solution of between about 0 to 20 percent concentration.

13. The method as claimed in claim 9 in which said fibrous binding material comprises asbestos fibers.

14. The method as claimed in claim 9 including in the mixture of filler material selected from the group consisting of calcium carbonate, silica, talc, and barium sulfate.

15. The method of producing an artificial oyster cultches which comprises mixing in a dry state about 5 to 75 percent of a cement selected from the group consisting of Portland cement and aluminous hydraulic cement; between about 0 to 50 percent lime in the form of calcium hydroxide or slaked lime, about 0.2 to 5.0 percent of a lubricant selected from the group consisting of zinc stearate, stearic acid, calcium stearate, magnesium stearate, aluminum stearate, and zinc soap, about 5 to 30 percent gypsum and fibrous binding material sufficient to make up the balance to 100 percent, pressing said mixture into cultches under sufficient pressure to enable the formed cultches to be handled, substantially saturating the formed cultches with a catalyzed aqueous solution and hardening the formed cultches.

16. The method as claimed in claim 15 in which the pressure used in forming the cultches is something of the order of 8 to 12 tons.

17. The method as claimed in claim 15 in which the catalyzed aqueous solution is sprayed on to the compressed cultches.

18. The method as claimed in claim 15 in which the catalyzed aqueous solution is an aqueous calcium chloride solution of between about 0 to 20 percent concentration.

19. The method as claimed in claim 15 in which said fibrous binding material comprises asbestos fibers.

20. The method as claimed in claim 15 including in the mixture a filler material selected from the group consisting of calcium carbonate, silica, talc, and barium sulfate.